(12) United States Patent
Miller et al.

(10) Patent No.: US 7,885,747 B2
(45) Date of Patent: Feb. 8, 2011

(54) SCOOTER SHIFTER

(75) Inventors: Keith Miller, Oklahoma City, OK (US); Peter Poxton, Mustang, OK (US)

(73) Assignee: Fallbrook Technologies Inc., San Diego, CA (US)

( * ) Notice: Subject to any disclaimer, the term of this patent is extended or adjusted under 35 U.S.C. 154(b) by 998 days.

(21) Appl. No.: 11/686,231

(22) Filed: Mar. 14, 2007

(65) Prior Publication Data

US 2007/0219696 A1  Sep. 20, 2007

Related U.S. Application Data

(60) Provisional application No. 60/783,108, filed on Mar. 14, 2006.

(51) Int. Cl.
*F16H 15/00* (2006.01)
*G06F 19/00* (2006.01)

(52) U.S. Cl. .................. 701/51; 340/459; 340/455

(58) Field of Classification Search ............... None
See application file for complete search history.

(56) References Cited

U.S. PATENT DOCUMENTS

| | | | |
|---|---|---|---|
| 4,706,518 A | 11/1987 | Moroto et al. | |
| 4,976,170 A | 12/1990 | Hayashi et al. | |
| 5,269,726 A | 12/1993 | Swanson et al. | |
| 5,413,540 A * | 5/1995 | Streib et al. | 477/43 |
| 5,514,047 A | 5/1996 | Tibbles et al. | |
| 5,607,373 A * | 3/1997 | Ochiai et al. | 477/46 |
| 5,669,846 A | 9/1997 | Moroto et al. | |
| 5,819,864 A * | 10/1998 | Koike et al. | 180/65.1 |
| 6,006,151 A | 12/1999 | Graf | |
| 6,019,701 A * | 2/2000 | Mori et al. | 477/46 |
| 6,251,043 B1 | 6/2001 | Gierling | |
| 6,266,931 B1 | 7/2001 | Erickson et al. | |
| 6,389,348 B1 * | 5/2002 | Takagi et al. | 701/58 |
| 6,409,625 B1 | 6/2002 | Sakai et al. | |
| 6,419,608 B1 | 7/2002 | Miller | |
| 6,520,878 B1 | 2/2003 | Leclair et al. | |
| 6,522,965 B1 | 2/2003 | Gierling | |
| 6,679,109 B2 | 1/2004 | Gierling et al. | |
| 6,718,247 B1 | 4/2004 | Graf et al. | |
| 7,011,600 B2 | 3/2006 | Miller et al. | |
| 2004/0087412 A1 | 5/2004 | Mori et al. | |
| 2005/0227809 A1 | 10/2005 | Bitzer et al. | |

FOREIGN PATENT DOCUMENTS

JP          2006-69397       *    2/2006

* cited by examiner

*Primary Examiner*—Michael J. Zanelli
(74) *Attorney, Agent, or Firm*—Knobbe, Martens, Olson & Bear LLP

(57) ABSTRACT

The present invention provides a system and method for automatically adjusting a continuously variable transmission (CVT) in a motorized vehicle. A microprocessor processor in the vehicle receives data about the operating status of the vehicle from a plurality. Examples of vehicle data include vehicle speed, motor speed, throttle position, current draw from a battery, and battery level. A servo motor is in mechanical communication with the CVT and provides an axial force to adjust the CVT. The microprocessor uses lookup tables of optimal set points for vehicle data to instruct the servo motor to adjust the transmission ratio of the CVT according to the vehicle data provided by the sensors.

18 Claims, 4 Drawing Sheets

SCOOTER SHIFTER

CROSS-REFERENCE TO RELATED APPLICATIONS

This application claims the benefit of and priority to U.S. Provisional Patent Application No. 60/783,108 filed Mar. 14, 2006 the technical disclosures of which are hereby incorporated herein by reference.

TECHNICAL FIELD OF INVENTION

The present invention relates generally to a continuously variable transmission (CVT) and specifically to a system and method for providing an automated adjustment to a CVT.

BACKGROUND OF THE INVENTION

A transmission is any mechanical linkage that converts an input torque to an output torque. It usually involves a series of gears that have differing diameters, allowing a first gear at a first rotation rate to link to a second gear rotating at a second rate. The most common application for transmissions is in a vehicle. For example, a car may have an automatic transmission or a manual transmission. A bicycle has a simple transmission that links the pedals to the hub of the rear wheel.

Transmissions allow an input force to be converted into a more useful and appropriate output. However, by using gears and linkages, a typical transmission may only have 4 or 5 ratios available. For example, a four speed automatic transmission in a car has only 4 sets of output gears to couple to the engine's input. A ten speed bike has only ten ratios of input to output. A need exists for a transmission that is not limited by the number of gears. Yet, to place a larger number of gears into a transmission increases its costs and weight and space requirements.

A continuously variable transmission (CVT) is a transmission that eliminates the need for a specified number of gears. Instead it allows an almost limitless number of input to output ratios. This is a benefit because it allows an output to be achieved (i.e. the speed of a vehicle) at an optimal input (i.e. the rpm of the engine). For example, an engine might be most efficient at 1800 rpm. In other words, the peak torque output for the engine might be achieved at this engine rpm, or perhaps the highest fuel economy. Consequently, it may be desirable to run at a specified RPM for an economy mode or a power mode. Yet, in third gear, the car might be going faster at 1800 ipm than the driver desires. A continuously variable transmission would allow an intermediate ratio to be achieved that allowed the optimal input to achieve the desired output.

CVT transmissions have a variator for continuously variable adjustment of the ratio. A customary structure is a belt drive variator having two pairs of beveled pulleys and rotating a torque-transmitter element therein, such as a pushing linked band or a chain. The beveled pulleys are loaded with pressure from the transmission oil pump in order, on one hand, to actuate the ratio adjustment and, on the other, to ensure a contact pressure needed for transmission of the torque upon the belt drive element. Another usual structure is a swash plate variator in semi-toroidal or fully toroidal design.

Examples of CVTs are exemplified by U.S. Pat. Nos. 6,419,608 and 7,011,600 assigned to Fallbrook Technologies of San Diego, Calif., the contents of which are hereby incorporated by reference. In each of those applications the axial movement of a rod or an axial force (as indicated by numeral 11 in each reference) is used to vary the input-to-output ratio of such transmissions.

FIG. 1 is a prior art schematic representation depicting the operation of manually controlled CVT or variator in a light electric vehicle, such as a scooter. As shown in FIG. 1, a manual push button control box 101 has buttons corresponding to a signal output 108 of 0% 102, 25% 103, 50% 104, 75% 105, and 100% 106 sent to a microprocessor 112. The microprocessor output can be shown on a display 150. The microprocessor 112 interfaces with a motor control board 114 which receives power from a battery pack 118.

A servo motor 120 engages a 90-degree gearbox 122 which provides an axial force 130 to a variator (CVT) 132 in contact with the rear wheel 134. The rear wheel 134 is powered by a chain 136 or other equivalent means connected to a drive motor 140 (e.g., Briggs & Stratton ETEK).

The speed of the drive motor 140 is regulated by a current sent by a motor control device 144. The motor control device 144 is regulated by a throttle 146 and is powered by the battery 118.

While a user of the electric vehicle can manually shift gears using the push button control, it would be desirable to have an automatic shifting transmission to permit an electric scooter to operate in a power mode or an economy mode. Consequently, a need exists to automatically adjust the input to output ratio based upon one or more input variables.

SUMMARY OF THE INVENTION

The present invention provides a system and method for automatically adjusting a continuously variable transmission (CVT) in a motorized vehicle, such as a battery powered scooter. A microprocessor processor in the vehicle receives data about the operating status of the vehicle from a plurality. Examples of vehicle data include vehicle speed, motor speed, throttle position, current draw from a battery, battery level, CVT setting, control settings of a motor control device, wind direction, wind speed, and tire pressure. A servo motor is in mechanical communication with the CVT and provides an axial force to adjust the CVT. The microprocessor uses lookup tables of optimal set points for vehicle data to instruct the servo motor to adjust the transmission ratio of the CVT according to the vehicle data provided by the sensors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
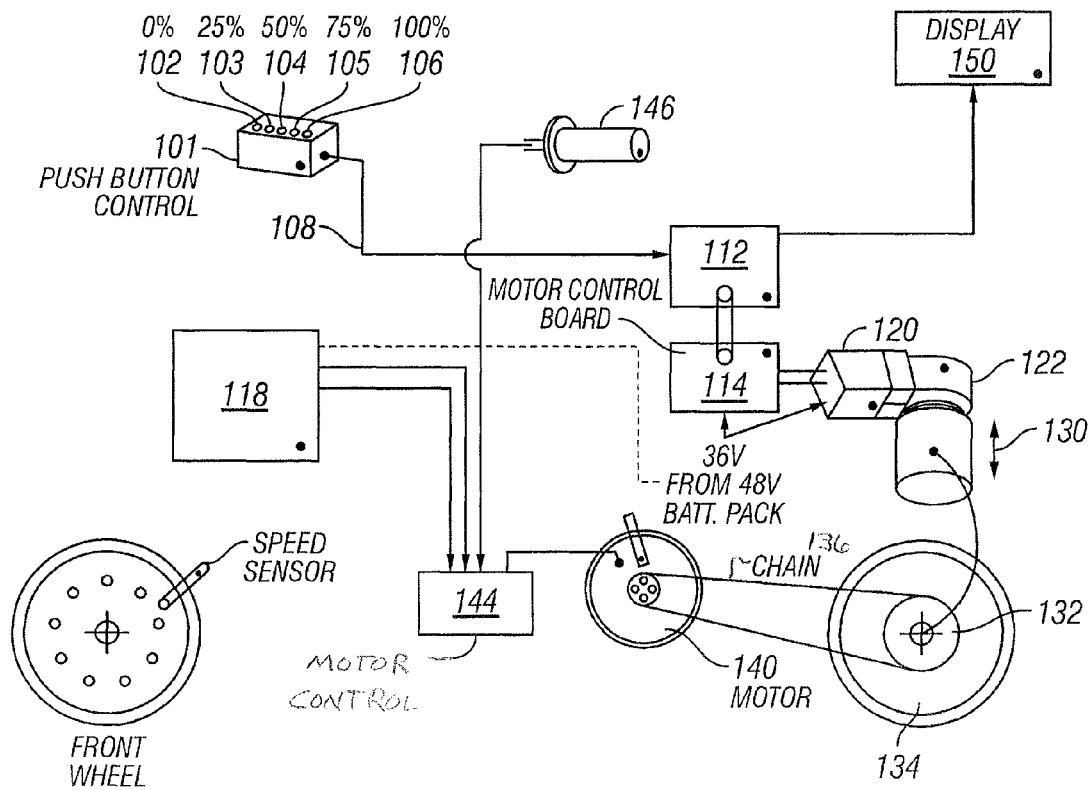
FIG. 1 is a prior art schematic representation depicting the operation of a manually controlled variator in a light electric vehicle.
Figure 2:
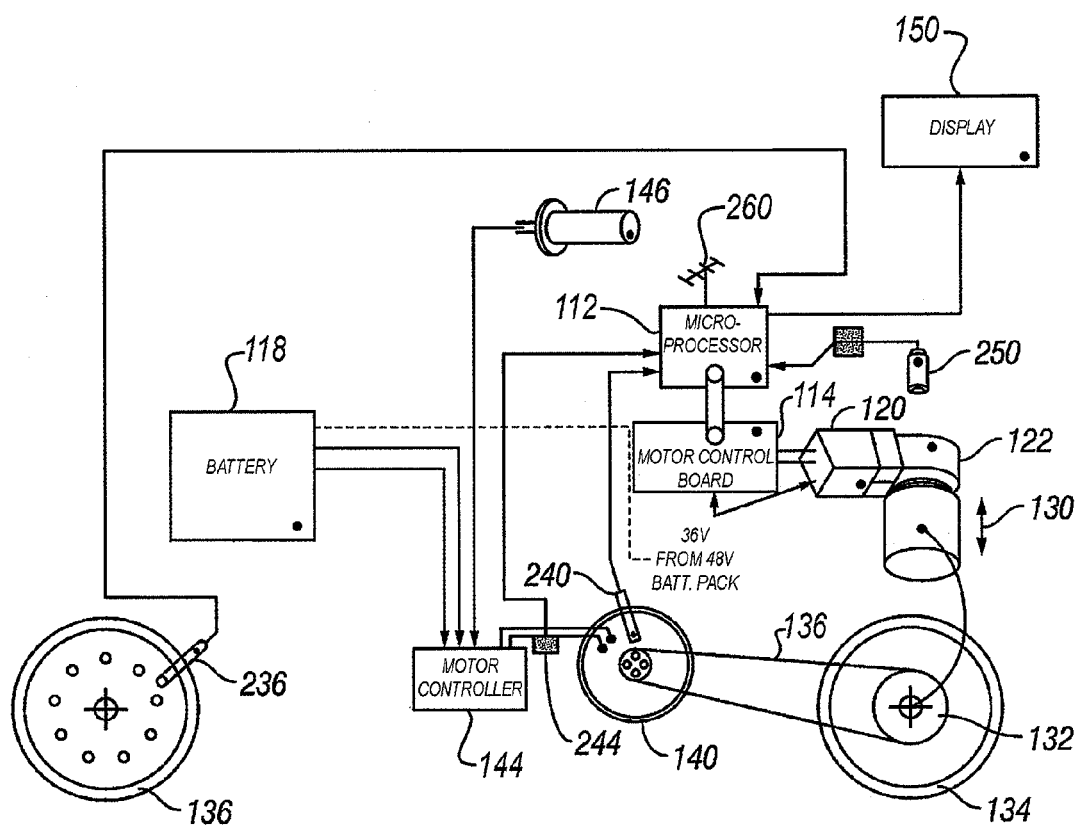
FIG. 2 is a schematic representation depicting the operation of automatically controlled variator in a light electric vehicle in accordance with one embodiment of the present invention.

FIG. 2 is a schematic representation depicting the operation of an automatically controlled variator in a light electric vehicle in accordance with one embodiment of the present invention. Instead of a push button control box 101 to manually control the transmission ratio of a CVT as shown in FIG. 1, the present invention uses one or more automatically-generated variables to automatically adjust the variator (CVT).

The amount of current being drawn from the motor control device 144, as provided by sensor 244, comprises an automatically generated variable that can be used as an input signal to the microprocessor 112. Motor controllers such as those available from Altrax of Grants Pass, OR can be used. Motor current draw is a function of throttle position and the state of the vehicle. For example:

Full throttle at 0 mph=full current draw
Full throttle at 35 mph down a hill=low current draw Another automatically generated variable supplied to the microprocessor 112 is the speed of the scooter, which is provided by a speed sensor 236 mounted on the front wheel 136. In the preferred embodiment, multiple magnets (e.g., 16) are mounted around the rim of the front wheel 136. All of the magnet poles are arranged in the same direction. The front wheel sensor 236 is mounted in a bracket from the wheel axel and wired into microprocessor 112. The microprocessor 112 counts a pulse when a magnet passes the sensor 236. The number of pulses in a given time period denotes the speed of the wheel, which is used to extrapolate the speed of the vehicle. This input is used in the calculation of optimized shifting to set a ratio in the variator 132.

Motor speed data provided by sensor 240 is another automatic variable that might be fed to the microprocessor 112. The motor speed sensor 240 operates on the same principle as the front wheel sensor 236. The signal provided by the sensor 240 gives a motor RPM value, which can be used to verify the transmission ratio using the following calculation:

Motor RPM/fixed gear reduction/variator gear reduction

The variator gear reduction is derived from the front wheel speed sensor 236 and can be used to validate vehicle speed or transmission ratio to the "set ratio" of the control system.

Other examples of automatically generated variables include, but are not limited to:

Position of the throttle
Current draw from the battery
Variator setting
Battery level
Control settings of the motor control device (e.g., linear or s-curve),
Wind Direction
Wind speed
Tire pressure External data may also be provided to the microprocessor via a blue tooth antenna 260.

The twist throttle 146 gives the motor controller 144 an input signal from the rider. Based on the amount the throttle 146 is twisted, it increases a resistance value to the main motor controller 144, which then translates this resistance value into voltage and current supplied to the drive motor 140. In the preferred embodiment the throttle is rated for 0-5 k resistance.

Figure 3A:
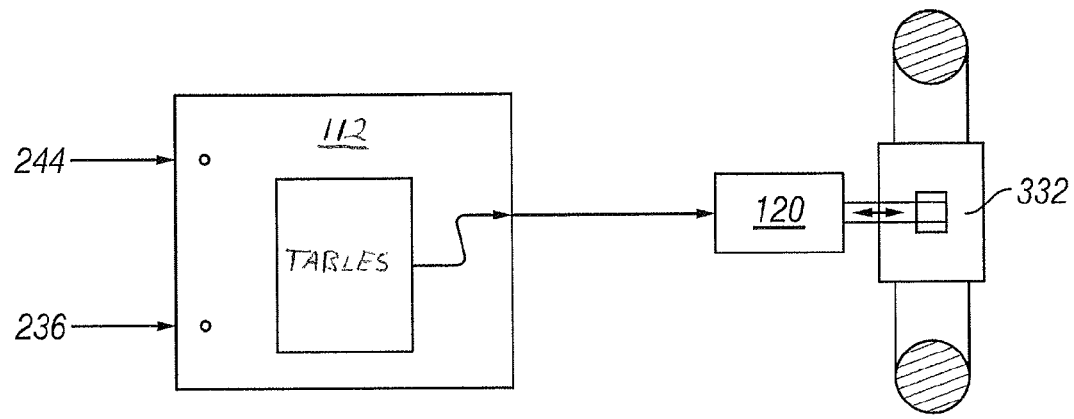
FIG. 3A is a schematic representation of the automatic operation of the shifter in accordance with one embodiment of the present invention.

FIG. 3A is a schematic representation of the automatic operation of the shifter in accordance with one embodiment of the present invention. In one embodiment, the microprocessor 112 comprises a basic stamp board available from Parallax, Inc. of Rocklin, Calif. The microprocessor 112 can be programmed to generate lookup tables to provide optimum set points for variable inputs (described above) to obtain either the best performance or optimal efficiency of the scooter system.

In the example depicted in FIG. 3A, the microprocessor 112 receives data from the front wheel speed sensor 236 and current draw sensor 244. The microprocessor 112 then outputs a signal to the servo 120, which in turn provides an axial force to the variator 332 to shift in an optimal manner that minimizes current draw 244 or power drain so as to provide optimal efficiency. The data sampling speed and servo adjustment speed are adjusted to minimize power drain on the system that would otherwise cancel the efficiency gains.

As shown in FIG. 2, microprocessor output can be shown on a display 150. This is an "on board" display of inputs and outputs that allows the user to verify settings and measurements during the testing phase. Examples of display readouts include:

Wheel count
Current amps
Voltage in (current sensor for motor)
Motor RPM
Wheel RPM
Mile per hour (MPH)

Figure 3B:
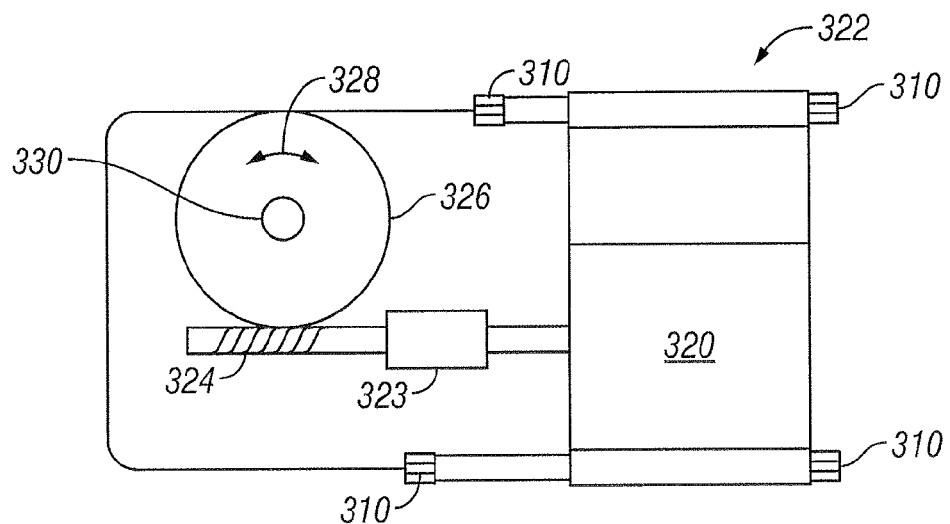
FIG. 3B is a schematic representation of the 90° gearbox in accordance with one embodiment of the present invention.

FIG. 3B is a schematic representation of the 90° gearbox in accordance with one embodiment of the present invention. The gearbox 322 comprises a servo 320 mounted with bolts 310 to the scooter frame (not shown). A coupler 323 is disposed between a threaded (worm) shaft 324 and the servo 320. Upon rotation of the threaded shaft 324, the wheel 326 rotates as depicted by numeral 328, causing the shift shaft 330 to rotate. Such rotation of the shift shaft 330 is converted into an axial force.

The 90° gearbox setup is used to provide a mechanical advantage (i.e. 36:1) and to reduce the size of the protrusion from the side of the scooter.

When the system is turned on the servo motor 320 is driven towards home until the shift shaft 330 contacts the home sensor 250 (shown in FIG. 2). The servo is stopped and the microprocessor 112 sets the internal electronic home position, registering voltage, turns, and rotation direction. In response to inputs from the sensors, based on the last known servo position a comparison is made between the current position and the "called" position. The microprocessor 112 then drives the servo 320 to the "called" position.

Figure 4A:
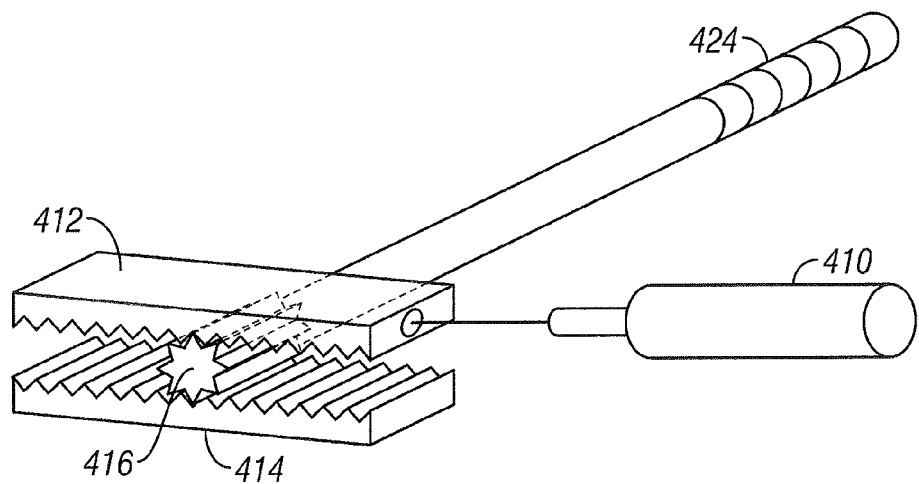
FIG. 4A is a schematic representation of a linear actuator in accordance with an alternative embodiment of the present invention.

FIG. 4A is a simplified schematic representation of a linear actuator in accordance with an alternative embodiment of the present invention. This embodiment uses a rack and pinion setup and can be mounted up inside of the scooter. The end 416 of the threaded shaft 424 is adapted to couple between a first tooth-like member 412 and a second tooth-like member 414. As the servo motor rotates the shaft end 416, the first tooth-like member 412 is driven axially and thereby provides an axial force to a member 410 that is in communication with the tooth-like member 412 and a variator (not shown).

Figure 4B:
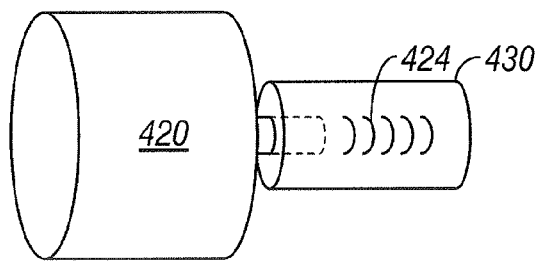
FIG. 4B is a schematic representation of a servo motor mounted on the rear wheel in accordance with an alternate embodiment of the present invention.

FIG. 4B is a schematic representation of a servo motor mounted on the rear wheel in accordance with an alternate embodiment of the present invention. The servo motor 420 is connected to a shaft 430 having a threaded portion 424 adapted to couple with a threaded variator shaft (not shown). The internal threaded portion 424 allows space for the variator shaft to be pulled in and out. The servo motor 420 turns the shaft 430 thereby causing the threaded portion 424 to move the variator shaft in or out, thus adjusting the variator.

Figure 4C:
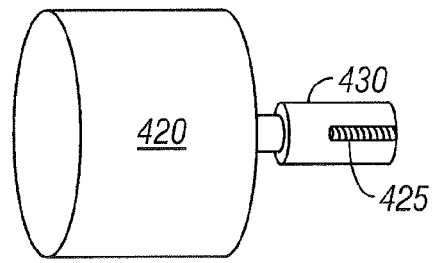
FIG. 4C is a schematic representation of an alternate servo motor design in accordance with another embodiment of the present invention.

FIG. 4C is a schematic representation of an alternate servo motor design in accordance with another embodiment of the present invention. Like the embodiment depicted in FIG. 4B, the servo motor 420 in this embodiment is also mounted at the rear wheel of the scooter. However, in this embodiment, the servo motor 420 is connected to a shaft 430 having a splined portion 425 adapted to couple with a variator shaft (not shown). The servo motor 420 turns the splined shaft 430, thereby creating an axial force on the variator shaft, thus adjusting the variator.

Figure 4D:
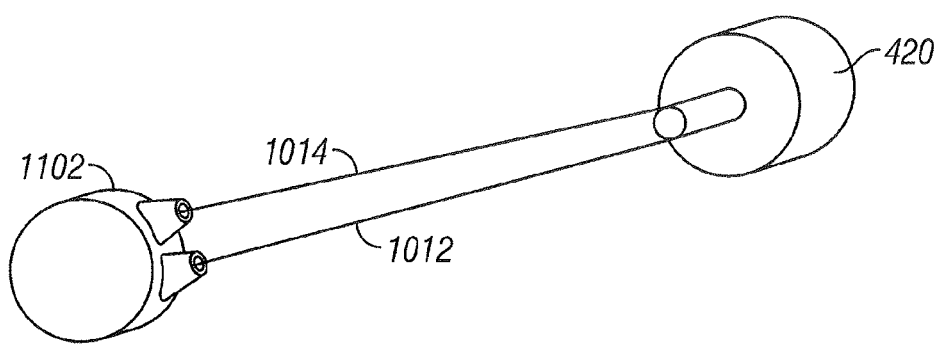
FIG. 4D is a schematic representation of the servo motor in communication with a hub that contains the variator in accordance with another alternate embodiment of the present invention.

FIG. 4D is a schematic representation of the servo motor in communication with a hub that contains the variator in accordance with another alternate embodiment of the present invention. In this embodiment, a hub 1102 containing the variator is mounted at the rear wheel of the scooter (not shown), and the servo motor is mounted up in the scooter. The rear hub 1102 includes a housing having an axial force that encloses and protects a pulley system coupled to cables 1012 and 1014. These cables 1012, 1014 in turn are connected to the servo motor 420, which alternately pulls cable 1012 or cable 1014 in order to adjust the variator inside the hub 1102.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A system for automatically adjusting a continuously variable transmission (CVT) in a motorized vehicle, the system comprising:
   a microprocessor;
   a plurality of sensors that provide said microprocessor with data about the operating status of the vehicle;
   a servo motor in mechanical communication with the CVT, wherein the servo motor provides an axial force to adjust the CVT; and
      a visual display adapted to display data from the microprocessor wherein the visual display is configured to allow a user to verify settings and measurements, wherein display readouts include at least one of the following:
      wheel count
      current amps
      voltage in (current sensor for motor)
      motor RPM
      wheel RPM; and
      MPH;
   wherein the microprocessor instructs said servo motor to adjust the transmission ratio of the CVT according to the vehicle data provided by said sensors.

2. The system according to claim 1, wherein the vehicle data provided to the microprocessor by said sensors comprises at least one of the following:
   vehicle speed;
   motor speed;
   throttle position;
   current draw from a battery;
   battery level;
   CVT setting;
   control settings of a motor control device;
   wind direction;
   wind speed; and
   tire pressure.

3. The system according to claim 1, wherein the microprocessor is programmed with lookup tables to provide optimum set points for vehicle data inputs to obtain the best vehicle performance.

4. The system according to claim 1, wherein the microprocessor is programmed with lookup tables to provide optimum set points for vehicle data inputs to obtain optimal efficiency of the vehicle.

5. The system according to claim 1, further comprising a 90° gearbox that provides mechanical communication between the servo motor and the CVT.

6. The system according to claim 1, further comprising a rack and pinion style linear actuator that provides mechanical communication between the servo motor and the CVT.

7. The system according to claim 1, wherein the servo motor is mounted on a vehicle wheel, adjacent to the CVT.

8. The system according to claim 1, further comprising a pulley system and cables that provide mechanical communication between the servo motor and the CVT.

9. The system according to claim 1, wherein the motor vehicle is a battery powered scooter.

10. A method for automatically adjusting a continuously variable transmission (CVT) in a motorized vehicle, the method comprising the steps of:
    programming a microprocessor in the vehicle with lookup tables of optimum set points for vehicle data;
    providing data about vehicle operating status from a plurality of sensors to said microprocessor;
    providing a visual display adapted to display data from the microprocessor, wherein the visual display is configured to allow a user to verify settings and measurements, wherein display readouts include at least one of the following:
    wheel count
    current amps
    voltage in (current sensor for motor)
    motor RPM
    wheel RPM; and
    MPH; and
    sending instructions from said microprocessor to a servo motor in mechanical communication with the CVT to adjust the transmission ratio of the CVT according to the vehicle data provided by said sensors.

11. The method according to claim 10, wherein the vehicle data provided to the microprocessor by said sensors comprises at least one of the following:
    vehicle speed;
    motor speed;
    throttle position;
    current draw from a battery;
    battery level;
    CVT setting;
    control settings of a motor control device;
    wind direction;

wind speed; and tire pressure.

12. The method according to claim 10, wherein the microprocessor is programmed with lookup tables to provide optimum set points for vehicle data inputs to obtain the best vehicle performance.

13. The method according to claim 10, wherein the microprocessor is programmed with lookup tables to provide optimum set points for vehicle data inputs to obtain optimal efficiency of the vehicle.

14. The method according to claim 10, further comprising providing mechanical communication between the servo motor and the CVT using a 90° gearbox.

15. The method according to claim 10, further comprising providing mechanical communication between the servo motor and the CVT using a rack and pinion style linear actuator.

16. The method according to claim 10, further comprising mounting the servo motor on a vehicle wheel, adjacent to the CVT.

17. The method according to claim 10, further comprising providing mechanical communication between the servo motor and the CVT using a pulley system and cables.

18. The method according to claim 10, wherein the motor vehicle is a battery powered scooter.

* * * * *

UNITED STATES PATENT AND TRADEMARK OFFICE
CERTIFICATE OF CORRECTION

| | | |
|---|---|---|
| PATENT NO. | : 7,885,747 B2 | Page 1 of 1 |
| APPLICATION NO. | : 11/686231 | |
| DATED | : February 8, 2011 | |
| INVENTOR(S) | : Keith Miller and Peter Poxton | |

It is certified that error appears in the above-identified patent and that said Letters Patent is hereby corrected as shown below:

In the Specifications:

At Column 1, Line 48, Change "1800 ipm" to --1800 rpm--.

At Column 3, Line 65, Change "Wind Direction" to --Wind direction--.

Signed and Sealed this
Sixteenth Day of October, 2012

David J. Kappos
*Director of the United States Patent and Trademark Office*